March 27, 1934.   B. L. MALLORY   1,952,723
SHOCK ABSORBER
Filed Jan. 22, 1931   2 Sheets-Sheet 1

Inventor
Bonnie L. Mallory
By Hull Brock & West
Attorney

March 27, 1934.   B. L. MALLORY   1,952,723
SHOCK ABSORBER
Filed Jan. 22, 1931   2 Sheets-Sheet 2
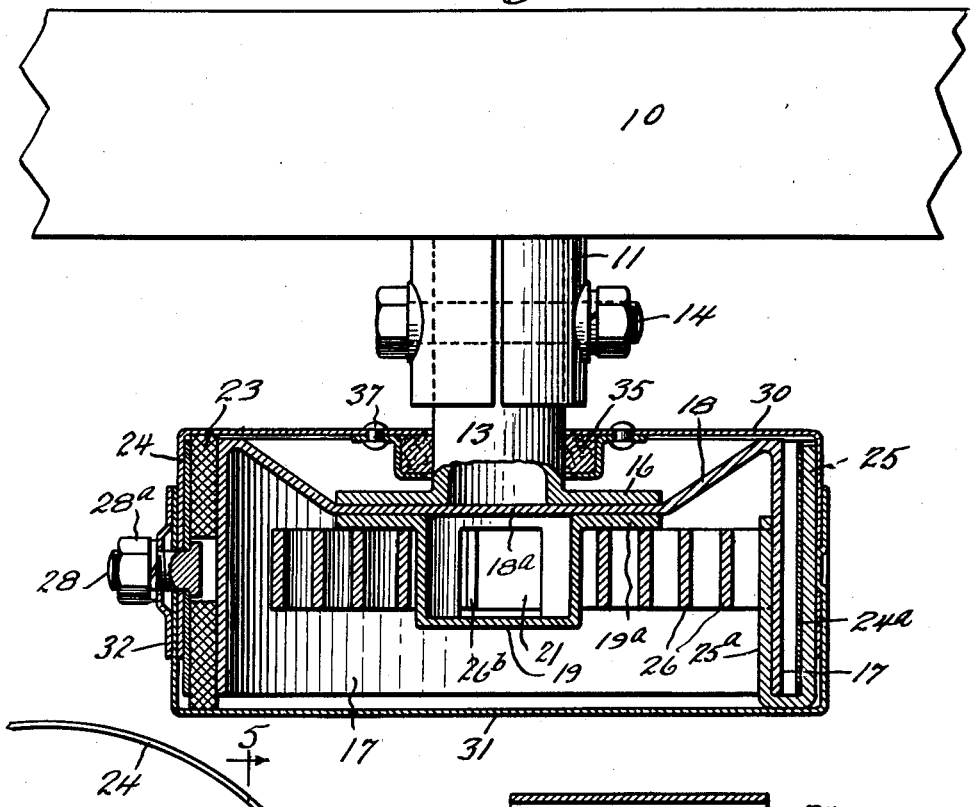
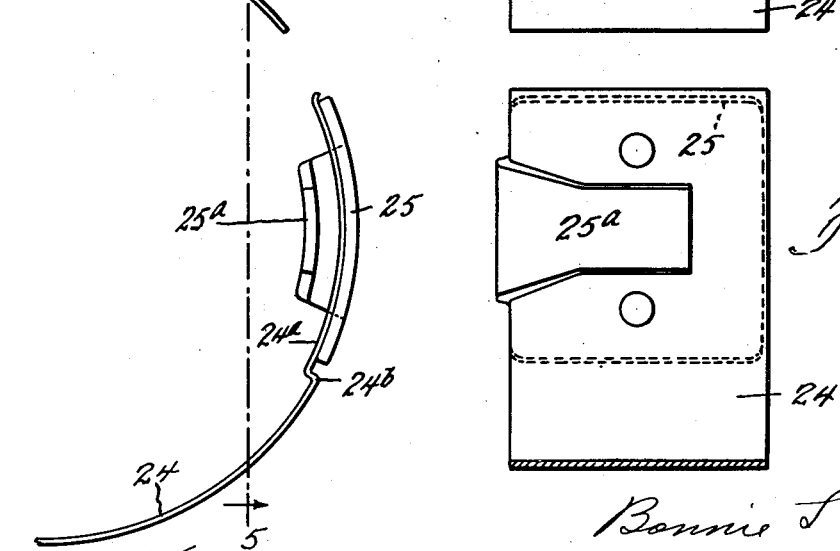
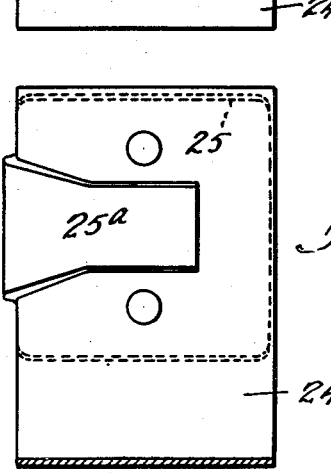
Inventor
Bonnie L. Mallory
By Hull Brock & West
Attorney Patented Mar. 27, 1934

1,952,723

UNITED STATES PATENT OFFICE 1,952,723

SHOCK ABSORBER

Bonnie L. Mallory, Cleveland Heights, Ohio, assignor to The Cleveland Shock Absorber Company, Cleveland, Ohio, a corporation of Ohio Application January 22, 1931, Serial No. 510,439

8 Claims. (Cl. 267—10)

This invention relates to a shock absorber of the friction type and has for its object to provide a particularly efficient, durable and inexpensive device of this character. A more specific object is the provision of a constant vacuum grip between a friction brake band and a brake drum in a sealed shock absorber packed in grease or heavy oil. A more limited object is the provision of a unique structure for connecting a spring with a portion of the shock absorber which moves under the action of a movable member of the vehicle on which the device is to be used. A further object is to provide means for causing initial gripping action between an end of the friction brake band and the brake drum both for the purpose of securing such initial friction and that of rendering more effective a pushing abutment which cooperates with the brake band hereinafter to be described. Other and more limited objects will become apparent as the description proceeds.

Figure 1:
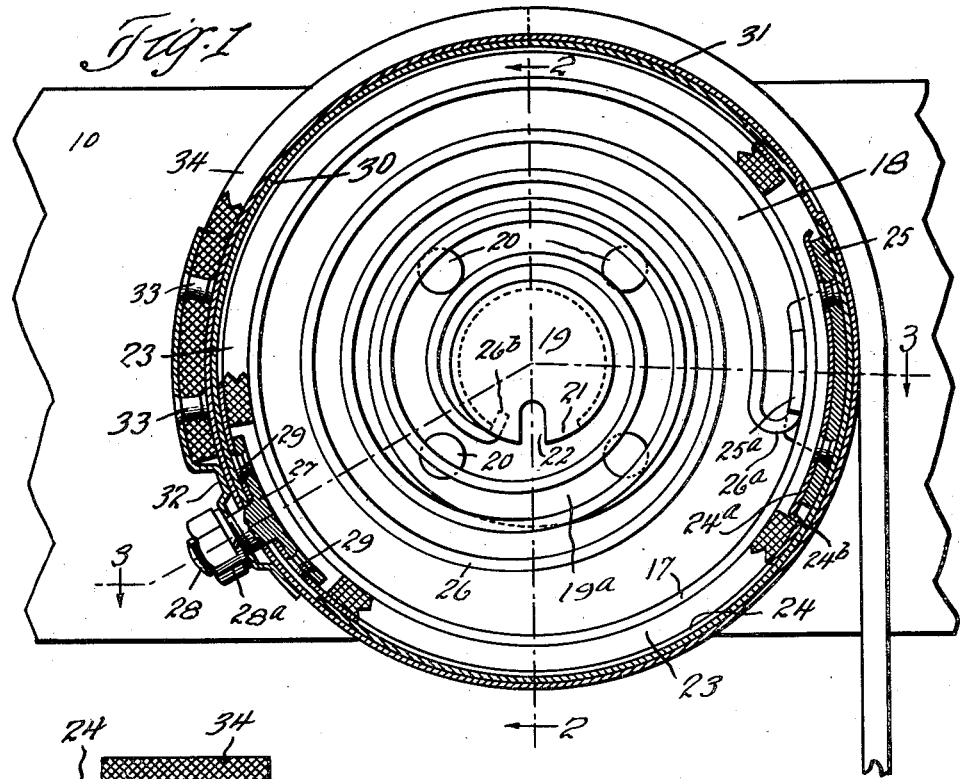
Figure 2:
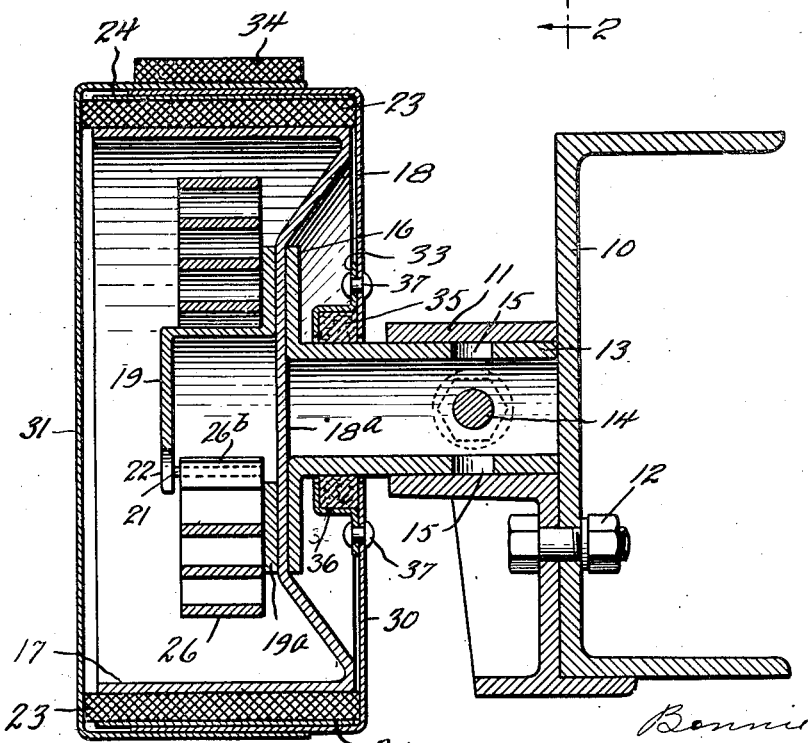

Fig. 1 is a sectional view parallel to the vehicle frame; Fig. 2 is a section on line 2—2 of Fig. 1; Fig. 3 is a section on line 3—3 of Fig. 1; Fig. 4 is a detail elevation of a thin metallic strip which cooperates with the friction band; and Fig. 5 is a section on line 5—5 of Fig. 4.

My improved type of shock absorber is adapted to be connected between a frame member 10 of a vehicle and the axle thereof in the usual manner, although it may be connected in reverse order if desired. A casting 11 is provided which is adapted to be attached to the frame 10 as by a bolt and nut 12 and to receive a tubular portion 13 which supports the remainder of the assembly in operative position. A bolt 14 may pass through openings 15 in the tubular portion 13 to provide an adjustment for the drum assembly in steps of 90°. Fine adjustment may be secured by means of shortening or lengthening the strap which is attached to the axle in a manner well understood by those skilled in the art. The tubular member 13 is provided with an outwardly extending flange 16 adapted to support a cup-shaped drum 17 provided with an inwardly extending dished end wall 18. Attached to the central flat portion 18a of the drum is a hat shaped boss 19. The boss 19 is provided with an outwardly extending flange 19a which is secured in position by rivets 20 which pass through the flanges 16 and 19a and the flat central portion 18a of the cup-shaped member 17. The boss 19 is provided with an opening 21 in the convex wall thereof and a notch 22 is provided in the end wall thereof registering with and spaced from the ends of the opening 21.

A floating friction brake band 23 of the usual woven construction, entirely unconnected with the remaining parts of the device and characterized by small elevations and depressions of substantially uniform size and distribution over the entire drum contacting surface thereof, is adapted to be positioned in substantially encircling relation to the drum 17. The floating brake band is not in any way fastened to another member of this device but is free to position itself on drum 17, which brings about a condition where the friction band is not subject to any strain at the places where it would be fastened but is subjected only to the rotational pressure upon the drum and the member 24. This gives it opportunity to adjust itself for the rotational pressure and frees it from strain at an anchorage. Surrounding the friction band 23 is a thin, resilient, metallic band 24 which is provided with an offset portion 24a affording a shoulder 24b adapted to abut an end of the friction band 23. Attached to the offset 24a as by rivets or spot welds is a curved member 25 provided with a retrorse portion 25a preferably having a curvature concentric with the main body thereof. As is clear from Figs. 1 and 3, the portion 25a of the member 25 is adapted to extend inside the convex wall of the drum 17 and to afford an abutment for cooperation with a hooked end 26a of a spiral spring 26. This construction provides in the operation of the device an initial pressure of the band 24 against the end of the friction band adjacent the abutment 24b. By varying the arcuate length of the body 25, I am able to adjust the magnitude of the initial pressure. This may be understood by considering the member 25 as acting as a lever. The fulcrum will then be considered, referring to Fig. 1, as being at the upper edge thereof, the load as being at the lower edge and the power as being applied at the point of contact between the curved portion 26a of the spring 26 with the portion 25a of the member 25. Regarding the operation of this member from this viewpoint, it becomes readily apparent that a change in the arcuate length of the principal portion of the member 25 will result in a change of the lever arm between the fulcrum and the load which will cause a corresponding change in the amount of rotational pressure exerted by the member 24 at the point 24b upon the friction band 23. A small forging 27 provided with a screw threaded portion 28 is attached as by rivets 29 to the member 24 at a point intermediate the ends thereof. The screw threaded portion 28 is adapted to extend through the housing member as hereinafter described, while the remainder is received loosely in a slot in the friction band 23.

The spiral spring 26 is adapted to connect between the boss 19 which is fixed with respect to the frame 10 and the portion 25ª of the member 25 to urge the movable portion of the assembly in counterclockwise direction, as seen in Fig. 1. This spring is provided with the hooked portion 26ª which abuts the portion 25ª, and with a right angularly turned end 26ᵇ adapted to pass through the notch 22 and to lock underneath the end of the boss 19 adjacent thereto in a manner already described.

A pair of housing members 30 and 31 are adapted to enclose the mechanisms described whereby the same may be packed with grease. These housing members may be secured together by means of bayonet slots fully described in one of my co-pending applications, Serial No. 496,408, filed November 18, 1930, patented October 25, 1932, No. 1,884,034. It is not thought necessary to give the details of this construction since it forms no part of the present application. The threaded portion of the forging 28 is adapted to pass through both members of the housing and to have secured thereto a member 32 which is connected by rivets 33 with a strap 34 which passes to the axle and is adjustably secured thereto in a manner well known to those skilled in the art. A gasket 35, held in place by a small plate 36, secured in place as by rivets 37, may be employed to prevent leakage of grease.

From the foregoing it will be evident that I have provided an improved shock absorber which is highly efficient and well adapted for its intended purpose, and while I have shown and described an illustrative embodiment, I wish it understood that I am not limited to the details thereof, but may carry out my invention in numerous forms within the scope of the appended claims.

Having thus described my invention, what I claim is:

1. In a shock absorber, a portion including a brake drum adapted to be fixed to one vehicle member, a floating friction band extending substantially around said drum, a thin, resilient, metal band extending along at least a part of said friction band, spring means connected between said first mentioned portion and said metal band and tending to rotate the latter in one direction, a floating housing enclosing the recited elements, and means actuated by another, relatively movable vehicle member for rotating said housing.

2. In a shock absorber, a portion including a brake drum adapted to be fixed to one vehicle member, a floating friction band extending substantially around said drum, a thin, resilient, metal band extending along at least a part of said friction band, spring means connected between said first mentioned portion and said metal band and tending to rotate the latter in one direction, a floating housing enclosing the recited elements, and means actuated by another, relatively movable vehicle member for rotating said housing, said metal band and said housing being connected together.

3. In a shock absorber, a portion including a brake drum adapted to be fixed to one vehicle member, a floating friction band extending substantially around said drum, a thin, resilient, metal band extending along at least a part of said friction band, spring means connected between said first mentioned portion and said metal band and tending to rotate the latter in one direction, a floating housing enclosing the recited elements, and means actuated by another, relatively movable vehicle member for rotating said housing, said metal band and said housing being connected together at a single point intermediate the ends of the former.

4. In a shock absorber, a fixed portion including, a tubular member provided with an outwardly extending flange at one end, a cup shaped drum member, and a flanged spring anchoring boss, the bottom of said drum member and said flanges being fastened together, said drum member having the bottom thereof dished inwardly.

5. In a shock absorber, a fixed portion including, a tubular member provided with an outwardly extending flange at one end, a cup shaped drum member, and a flanged spring anchoring boss, the bottom of said drum member and said flanges being fastened together, said boss being hat shaped and the bottom of said drum member being dished inwardly.

6. In a shock absorber, a fixed portion including, a tubular member provided with an outwardly extending flange at one end, a cup shaped drum member, and a flanged spring anchoring boss, the bottom of said drum member and said flanges being fastened together, said boss being hat shaped and having an opening in the convex wall thereof and a notch in the end wall communicating with said opening.

7. In a shock absorber, a fixed portion including, a tubular member provided with an outwardly extending flange at one end, a cup shaped drum member, and a flanged spring anchoring boss, the bottom of said drum member and said flanges being fastened together, said boss being hat shaped and having an opening in the convex wall thereof and a notch in the end wall communicating with said opening, said notch being spaced from both edges of said openings whereby to form a lock substantially as described.

8. In a device of the class described, as a subcombination a drum member, means for supporting same in fixed relation to a vehicle member, a floating friction band partially encircling said drum and adapted to bear against the same in braking relation, a thin, resilient, metal band extending along said friction band and provided with means adapted to abut a portion of said friction band to move the same around said drum, and a curved member secured to said metal band and provided with a retrorse portion extending inwardly around the edge of the drum member.

BONNIE L. MALLORY.